United States Patent Office 3,419,514
Patented Dec. 31, 1968

3,419,514
AIR DRYING FOOD RELEASE COATING
Ronald O. Hadlock, Greensboro, N.C., assignor to Dow Corning Corporation, Midland, Mich., a corporation of Michigan
No Drawing. Filed Apr. 1, 1965, Ser. No. 444,847
8 Claims. (Cl. 260—33.4)

This invention relates to new compositions particularly designed for use by housewives on cooking utensils.

It has been known for many years that organosiloxanes are good release agents for bread and other pastries. In general, a siloxane resin is applied to the pan or other cooking utensil and the resin is then cured by heating. Food cooked against the cured resin film will release easily without the necessity of using organic greases. This discovery led to a major improvement in commercial bakeries and at the present time most of the commercial bread baked in the United States is baked in pans coated with silicone resins. U.S. Patent 2,606,510 is the basic patent on this process.

Whereas, the heretofore employed siloxane resins have been outstandingly successful when used in commercial baking operations, they have not proved satisfactory for use by housewives in the home. One reason is that the heretofore used siloxane resins are relatively difficult to cure. Whereas this is no obstacle in a commercial pan coating establishment, it is an obstacle to home use for the average housewife has neither the time, facilities or inclination to go through the rather involved curing process necessary. Furthermore, the heretofore used commercial siloxane resins coatings are limited in the type of foods that can be satisfactorily released from the surface. In fact, they are used almost exclusively for loaf bread, rolls and certain types of cakes. Consequently, it is highly desirable to provide a composition for home use which is easy to cure and which releases the widest possible types of foodstuff.

It has also been suggested, as shown in U.S. Patent 2,462,242, that silicone greases can be used in lieu of organic greases for release of food. This method, however, suffers from the obvious disadvantage that one is merely substituting one type of grease for another and even though the silicone grease is thermally stable, it does not form a durable film on the cooking utensil and thus has to be reapplied every time the pan is cleaned. In addition, it has been suggested in U.S. Patent 2,793,197 that release of foodstuffs could be obtained by employing mixtures of a rubbery siloxane coating and a fluid siloxane. The primary difficulty with this suggestion is that the coatings rapidly deteriorate due to adsorption of oils and greases from the foodstuff into the film. Once the film has deteriorated, it no longer gives proper release.

A vast improvement in siloxane release coatings for use by housewives was made by applicant's composition described and claimed in his copending application Ser. No. 368,696, filed May 19, 1964, entitled "Food Release Coating." However, these coatings still had to be heated to cure them and such a procedure is troublesome to the average housewife.

It is the object of this invention to provide a superior resinous siloxane composition which will air cure when applied to a cooking utensil or other surface, and which will give release from almost every type of foodstuff one would want to cook. Another object is to make cooking utensils far more easily cleaned from charred grease and other organic material than is normally obtained. Another object is to provide a release coating which can be readily repaired by the mere application of more material in case the coating is ruptured. Other objects and advantages will be apparent from the following description.

This invention relates to an air drying composition consisting essentially of a mixture of:

(a) from 30 to 70% by weight of a phenylmethylpolysiloxane having a silicon-bonded hydroxyl content of at least 3% by weight, a phenyl to silicon ratio of at least .3 and a total phenyl and methyl to silicon ratio of from 1.2 to 1.7 inclusive, (b) from .1 to 15% by weight of

where R is an aliphatic hydrocarbon radical of 1 to 4 carbon atoms and R' is an alkyl radical of 1 to 2 inclusive carbon atoms, (c) from 1 to 15% by weight of a methylpolysiloxane fluid having at least 2% by weight silicon-bonded hydroxyl groups, and (d) from 20 to 65% by weight of methyltriacetoxysilane.

This invention also relates to solutions containing:

(1) from .1 to 15% by weight of a combination of (a), (b), (c) and (d), and (2) from 85 to 99.9% by weight based on the weight of (1) and (2) of a solvent for (1), having a boiling point below 150° C. at 760 mm.

The preferred compositions of this invention are those in which (a) is in amount from 40 to 55% by weight, (b) is in amount from 0.1 to 1.0% by weight, (c) is in amount from 3 to 15% by weight, and (d) is in amount from 35 to 50% by weight and to solutions of these.

The best method of preparing the compositions of this invention is to first mix ingredients (b), (c) and (d), and thereafter mix the material with (a). Obviously this mixing is best carried out in solution. If a catalyst is employed it is best to add it after the other ingredients have been mixed. It is also quite probable that some reaction between the silicon-bonded OH and the silicon-bonded acetoxy groups takes place during formulation and/or storage. The term "a mixture of" is intended to cover any incidental reaction product resulting from a mixture of the specified ingredients.

There are four essential ingredients in the compositions of this invention. The basic ingredient is the methylphenylpolysiloxane (a), which can contain any combination of the following siloxane units: $PhSiO_{3/2}$, $Ph_2SiO$, $PhMeSiO$, $MeSiO_{3/2}$, $Me_2SiO$, $SiO_{4/2}$, together with limited amounts of $R_3SiO_{1/2}$, where R is phenyl or methyl. It is to be understood that the combination of the various units must be such that the polysiloxane falls within the limitations above described. The resin must contain at least 3% by weight silicon-bonded hydroxyl groups, but the upper limit of the hydroxyl concentration is not critical. Mixtures of two or more phenylmethylpolysiloxanes can be employed provided the mixture falls within the composition range herein disclosed.

Ingredient (b) can be, for example, any of the following glycol ethers: the monomethylether of dipropylene glycol, monoethylether of dibutylene glycol, monobutylether of dipropylene glycol, monovinylether of dipropylene glycol, mono-isopropylether of dibutylene glycol, and

It has been found that when higher or lower molecular weight monoalkylethers of alkylene glycols are employed, unsatisfactory results are obtained.

Ingredient (c) is a fluid methylpolysiloxane containing at least 2% by weight silicon-bonded hydroxyl groups. The term methylpolysiloxane fluid means that the fluid is essentially a dimethylpolysiloxane, but can contain limited amounts of $SiO_{4/2}$ units or $MeSiO_{3/2}$ units. In general, the latter units are present in amount less than 10 mol percent.

The compositions of this invention can be applied to the surface by any suitable means such as dipping, spraying, brushing and the like. Preferably, this is done from a solution in a solvent which boils below 150° C. The solvent can be any suitable material such as petroleum ethers, toluene, xylene, and chlorinated solvents such as perchloroethylene, 1,1,1-trichloroethane and methylene chloride. It is obviously preferred to employ a nontoxic noninflammable solvent inasmuch as this product is designed for household use. However, the invention is not in any way limited to the use of such solvents.

The compositions of this invention are applicable to any type of cooking surface such as steel, copper, aluminum, ceramic, tin, magnesium and the like, and they can be employed with any type of foods such as bread, cake, eggs, meats, vegetables, sauces, gravies or combinations thereof.

The term consisting essentially of as employed herein means that the compositions are essentially of the specified critical ingredients, but may contain non-critical ingredients such as solvents, perfumes, coloring materials, and the like, or small amounts of other acetoxy silanes such as dimethyldiacetoxysilane or ethyltriacetoxysilane, which do not substantially affect the desirable characteristics of the cured film.

The compositions of this invention are characterized by their ability to cure at room temperature in a short period of time after being applied to a surface. The air drying is brought about primarily by the reaction with the moisture of the atmosphere. In some cases, particularly when curing is to be carried out under conditions of high humidity it is desirable, but not essential, to incorporate a siloxane hydroxyl condensation catalyst in the composition. For this purpose any siloxane hydroxyl condensation catalyst can be employed. Suitable catalysts are well-known in the art.

A particularly desirable form of catalysts are the tin salts of carboxylic acids such as dibutyl tin diacetate, dibutyl tin dilaurate, dibutyl tin dioctoate, stannous octoate, stannous naphthenate, stannous linoleate, stannous isobutyrate, stannous oleate, stannous stearate, stannous benzoate, stannous naphthoate, stannous laurate, stannous o-thymate, stannous beta-benzoylpropionate, stannous crotonate, stannous tropate, stannous p--bromobenzoate, stannous palmitoleate, stannous cinnamate and the stannous salt of phenylacetic acid.

In the specification the following abbreviations are employed, Me for methyl, Et for ethyl and Ph for phenyl.

The following examples are illustrative only and should not be construed as limiting the invention which is properly delineated in the appended claims.

EXAMPLE 1

The formuation employed in this example was made by mixing (d) methyltriacetoxysilane, (c) a hydroxylated dimethylpolysiloxane fluid having 4.2% by weight silicon-bonded hydroxyl groups and (b) the monomethylether of dipropylene glycol, and thereafter adding this mixture to 1,1,1-trichloroethane solvent. The resulting solution was mixed with (a) a methylphenylpolysiloxane resin containing 4% by weight silicon-bonded hydroxyl groups, having a phenyl to silicon ratio of .53 and a total phenyl and methyl to silicon ratio of 1.35. Dibutyl tin dilaurate was then added to the solution in amount of one part tin per 100 parts total siloxane. In the finished product the proportions of ingredients were as follows: (a) 52% by weight, (b) .24% by weight, (c) 4.76% by weight, (d) 43% by weight, all based on the combined weights of (a), (b), (c) and (d). The solution contained 95% by weight 1,1,1-trichloroethane and 5% by weight total (a), (b), (c) and (d).

This solution was applied to an aluminum alloy fry pan to form a thin coating and allowed to air dry.

Eggs were cooked in the coated pan without the use of grease and after thirty cookings no sticking had been observed. In addition to eggs, the coated pan was used to cook tomato paste, cherry pipe filling, peanut butter cookies, potatoes, hamburgers, fried chicken, cheese casserole, and pork chops. The release with these foods was good. Grease was used only in the preparation of the fried chicken.

EXAMPLE 2

The following formulations were mixed in accordance with the procedure of Example 1 employing the ingredients of that example in the proportions shown below. In each case the percent of each ingredient is based on the combined weights of (a), (b), (c) and (d), and in each case the final product contained 5% by weight of total (a), (b), (c) and (d), 95% by weight of 1,1,1-trichloroethane and stannous oleate in amount of 1 part tin per 100 parts of the combined weights of (a), (c) and (d).

FORMULATIONS (PERCENT)

|     | 1 | 2 | 3 | 4 |
| --- | --- | --- | --- | --- |
| (a) | 52.0 | 42.00 | 32.60 | 68.50 |
| (b) | 0.24 | 0.29 | 0.34 | 9.46 |
| (c) | 9.56 | 11.6 | 6.76 | 1.58 |
| (d) | 38.2 | 46.11 | 60.30 | 20.46 |

Formulations 1 and 2 gave a far greater number of releases of food without recoating the pan than did formulations 3 and 4. However, all formulations were operative.

EXAMPLE 3

The process of Example 1 was repeated, except that (a) was a methylphenylpolysiloxane having 3.5% by weight silicon-bonded hydroxyl groups, a phenyl to silicon ratio of .38 and a total phenyl and methyl to silicon ratio of 1.29. The performance of the composition was equivalent to that of Example 1.

EXAMPLE 4

Good release is obtained when the following glycol ethers are substituted in the procedure of Example 1: monomethyl ether of dibutylene glycol, monobutyl ether of dipropylene glycol, monoethyl ether of dipropylene glycol.

That which is claimed is:

1. A cured coating, suitable for food release, prepared by curing a composition consisting essentially of a mixture of:
   (a) from 30 to 70% by weight of a phenylmethylpolysiloxane having a silicon-bonded hydroxyl content of at least 3% by weight, a phenyl to silicon ratio of at least .3 and a total phenyl and methyl to silicon ratio from 1.2 to 1.7 inclusive,
   (b) from .1 to 15% by weight of

where R is an aliphatic hydrocarbon radical of from 1 to 4 inclusive carbon atoms, and R' is an alkyl radical of from 1 to 2 inclusive carbon atoms,
   (c) from 1 to 15% by weight of a methylpolysiloxane fluid having at least 2% by weight silicon-bonded hydroxyl groups, and
   (d) from 20 to 65% by weight of methyltriacetoxysilane, all percentages being based on the combined weights of (a), (b), (c) and (d).

2. The composition in accordance with claim 1 in which (a) is in amount from 40 to 55% by weight, (b) is in amount of from .1 to 1% by weight, (c) is in amount from 3 to 15% by weight, and (d) is in amount from 35 to 50% by weight.

3. A cured coating, suitable for food release, prepared by curing a composition consisting essentially of a mixture of:
(1) from .1 to 15% by weight of
  (a) from 30 to 70% by weight based on the weight of (1) of a phenylmethylpolysiloxane having a silicon-bonded hydroxyl content of at least 3% by weight, a phenyl to silicon ratio of at least .3 and a total phenyl and methyl to silicon ratio of from 1.2 to 1.7 inclusive,
  (b) from .1 to 15% by weight based on the weight of (1) of

where R is an aliphatic hydrocarbon radical of from 1 to 4 inclusive carbon atoms and R' is alkyl radical of from 1 to 2 inclusive carbon atoms,
  (c) from 1 to 15% by weight based on the weight of (1) of a methylsiloxane fluid having at least 2% by weight silicon-bonded hydroxyl groups, and
  (d) from 20 to 65% by weight based on the weight of (1) of methyltriacetoxysilane, all percentages in (1) being based on the combined weight of (a), (b), (c) and (d), and
(2) from 85 to 99.9% by weight based on the weights of (1) and (2) of a solvent for (1) having a boiling point below 150° C. at 760 mm.

4. A composition in accordance with claim 3 in which (a) is in amount from 40 to 55% by weight, (b) is in amount from .1 to 1% by weight, (c) is in amount from 3 to 15% by weight and (d) is in amount from 35 to 50% by weight.

5. A composition in accordance with claim 1 in which (b) is the monomethylether of dipropylene glycol.

6. A composition in accordance with claim 2 in which (b) is the monomethylether of dipropylene glycol.

7. A composition in accordance with claim 3 in which (b) is the monomethylether of dipropylene glycol.

8. A composition in accordance with claim 4 in which (b) is the monomethylether of dipropylene glycol.

References Cited

UNITED STATES PATENTS 3,002,946  10/1961  Thomas _____ 260—875
3,231,532  1/1966  Modic _____ 260—33.2

FOREIGN PATENTS 862,470  3/1961  Great Britain.
652,693  11/1962  Canada.

MORRIS LIEBMAN, *Primary Examiner.*

J. E. CALLAGHAN, *Assistant Examiner.*

U.S. Cl. X.R.

260—33.2, 825